United States Patent
Sano et al.

(10) Patent No.: US 11,046,852 B2
(45) Date of Patent: Jun. 29, 2021

(54) RESIN MOLDED PRODUCT AND RESIN COMPOSITION

(71) Applicant: FUJIFILM BUSINESS INNOVATION CORP., Tokyo (JP)

(72) Inventors: Tatsuki Sano, Kanagawa (JP); Shunsuke Nozaki, Kanagawa (JP); Soichiro Kitagawa, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 41 days.

(21) Appl. No.: 16/558,810

(22) Filed: Sep. 3, 2019

(65) Prior Publication Data

US 2020/0291231 A1    Sep. 17, 2020

(30) Foreign Application Priority Data

Mar. 13, 2019    (JP) .............................. JP2019-046137

(51) Int. Cl.
| | |
|---|---|
| *C08L 83/04* | (2006.01) |
| *C08L 79/08* | (2006.01) |
| *C08K 3/36* | (2006.01) |
| *C08G 77/04* | (2006.01) |
| *C08K 7/22* | (2006.01) |

(52) U.S. Cl.
CPC ............ *C08L 83/04* (2013.01); *C08G 77/045* (2013.01); *C08K 3/36* (2013.01); *C08K 7/22* (2013.01); *C08L 79/08* (2013.01); *C08K 2201/003* (2013.01); *C08K 2201/011* (2013.01); *C08L 2207/53* (2013.01)

(58) Field of Classification Search
CPC ...... C08L 83/04; C08L 79/08; C08L 2207/53; C08K 3/36; C08K 2201/003; C08K 2201/011; C08K 7/22; C08G 77/045
USPC ......................................................... 524/493
See application file for complete search history.

(56) References Cited

U.S. PATENT DOCUMENTS 9,278,866 B2 * 3/2016 Kalla ...................... C01B 33/18

FOREIGN PATENT DOCUMENTS

| | | |
|---|---|---|
| JP | H0-417489 B2 | 3/1992 |
| JP | 2010-87097 A | 4/2010 |
| JP | 2011-225756 A | 11/2011 |
| WO | 2004/067638 A1 | 8/2004 |

OTHER PUBLICATIONS

STIC search, Oct. 22, 2020. (Year: 2020).*

* cited by examiner

*Primary Examiner* — Hui H Chin
(74) *Attorney, Agent, or Firm* — Oliff PLC

(57) ABSTRACT

A resin molded product contains a resin and hollow particles each having a shell layer containing a silsesquioxane represented by the following formula $(RSiO_{1.5})_n$ wherein R represents an alkyl group having 1 or more and 3 or less carbon atoms, a phenyl group, or a vinyl group, and n is an integer of 7 or more and 150 or less.

11 Claims, No Drawings

RESIN MOLDED PRODUCT AND RESIN COMPOSITION

CROSS REFERENCE TO RELATED APPLICATIONS

This application is based on and claims priority under 35 USC 119 from Japanese Patent Application No. 2019-046137 filed Mar. 13, 2019.

BACKGROUND

(i) Technical Field

The present disclosure relates to a resin molded product and a resin composition.

(ii) Related Art

Regarding electronic devices, such as central processing units (CPU) and memory, operating frequency has increased, and devices have been miniaturized. On the other hand, there are several problems, such as an increase in transmission loss due to the increase in operating frequency and an increase in delay time due to miniaturization of wiring.

Therefore, it is desired that insulating films for circuit boards used in the above electronic devices have characteristics such as a low dielectric constant and a low dielectric dissipation factor.

Japanese Unexamined Patent Application Publication No. 2010-87097 discloses an insulating resin composition for printed wiring boards and an insulating resin sheet for printed wiring boards. The insulating resin composition contains a solvent-soluble polyimide resin, inorganic hollow fine particles, and a solvent in which the polyimide resin dissolves. The insulating resin sheet contains a solvent-soluble polyimide resin and inorganic hollow fine particles.

Japanese Unexamined Patent Application Publication No. 2011-225756 discloses a low-dielectric resin composition and a low-dielectric film formed, of the low-dielectric resin composition. The low-dielectric resin composition contains hollow silica particles having an average particle diameter of 0.05 to 3 μm, a porosity of 30% to 90%, and a BET specific surface area of less than 30 m²/g dispersed in the matrix resin.

Japanese Patent No. 4171489 discloses a resin composition containing a thermosetting resin and hollow particles. The shell of the hollow particle has a monolayer structure f ed of any one of polymers of crosslinking monomers, copolymers of crosslinking monomers, and copolymers of a crosslinking monomer and a monofunctional monomer. The hollow particles have an average particle diameter of 0.1 to 30 μm and a shell thickness of 0.01 to 4 μm. The volume percentage of the inner voids relative to the total volume of the hollow particles is 40% to 80%.

SUMMARY

It is desired that insulating films for circuit boards have dielectric properties, such as a low dielectric constant and a low dielectric dissipation factor. To obtain such desired properties, a technique in which hollow particles are dispersed in the matrix of the insulating film to introduce voids in the insulating film has been studied, as described in the patent literature 1 to 3.

When hollow particles each have a shell layer formed of silica, the insulating film has good strength and good dimensional stability to heat; however, silica has a high dielectric constant, and thus, the insulating film does not have sufficient dielectric properties. On the other hand, when hollow particles each have a shell layer formed of an organic material, the dielectric properties of the insulating film are likely to decrease; however, hollow particles have low heat resistance, and the insulating film is likely to have a high thermal expansion property. Thus, the insulating film does not have sufficient dimensional stability to heat.

Aspects of non-limiting embodiments of the present disclosure relate to providing a resin molded product that has better dielectric, properties (i.e., a lower dielectric constant and a lower dielectric dissipation factor) and higher dimensional stability to heat than a resin molded product containing hollow particles each having a shell layer formed of silica and a resin molded product containing hollow particles each having a shell layer formed of an organic material.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a resin molded product containing a resin and hollow particles each having a shell layer containing a silsesquioxane represented by the following formula $(RSiO_{1.5})_n$ wherein R represents an alkyl group having 1 or more and 3 or less carbon atoms, a phenyl group, or a vinyl group, and n is an integer of 7 or more and 150 or less.

DETAILED DESCRIPTION

Hereinafter, an exemplary embodiment of the present disclosure will be described.

Resin Molded Product

The resin molded product according to the present exemplary embodiment contains a resin and hollow particles each having a shell layer containing a silsesquioxane represented by the following formula (1):

$$(RSiO_{1.5})_n \qquad (1)$$

wherein R represents an alkyl group having 1 or more and 3 or less carbon atoms, a phenyl group, or a vinyl group, and n is an integer of 7 or more and 150 or less.

Hereinafter, the resin molded product according to the present exemplary embodiment is also simply referred to as "resin molded product". A silsesquioxane represented by formula (1) is also simply referred to as "silsesquioxane". Hollow particles each having a shell layer containing the silsesquioxane represented by formula (1) are also referred to as "specific hollow particles".

The silsesquioxane represented by formula (1) has properties intermediate between silica (i.e., $SiO_2$), which is an inorganic compound, and an organic silicone (i.e., $(R_2SiO)_n$).

The silsesquioxane represented by formula (1) has higher hydrophobicity and lower hygroscopy than silica (i.e., $SiO_2$), which is an inorganic compound. Thus, it is considered that a resin molded product containing hollow particles each having a shell layer containing the silsesquioxane is likely to have a lower dielectric constant and a lower dielectric dissipation factor than a resin molded product containing hollow particles each having a shell layer formed of silica.

The silsesquioxane represented by formula (1) has heat resistance and hardness, which are properties of compounds derived from inorganic compounds. Thus, it is considered that a resin molded product containing hollow particles each having a shell layer containing the silsesquioxane is likely to have higher dimensional stability to heat than a resin molded product containing hollow particles each having a shell layer formed of an organic material.

It is presumed that the resin molded product according to the present exemplary embodiment has excellent dielectric properties (i.e., low dielectric constant and a low dielectric dissipation factor) and high dimensional stability to heat, accordingly.

Hereinafter, components in the resin molded product according to the present exemplary embodiment will be described.

Specific Hollow Particles

The specific hollow particles in the resin molded product each have a shell layer containing the silsesquioxane represented by formula (1) described below.

In the resin molded product, the specific hollow particles are dispersed in the matrix of the resin described later.

Each of the specific hollow particles may be a single-void hollow particle (i.e., particle having a void inside) or a multi-void hollow particle (i.e., particle having plural voids inside). To control the porosity of the resin molded product and to readily suppress the liquid permeability, a single-void hollow particle is preferred. Silsesquioxane Represented by formula (1):

$$(RSiO_{1.5})_n \quad (1)$$

wherein R represents an alkyl group having 1 or more and 3 or less carbon atoms, a phenyl group, or a vinyl group, and n is an integer of 7 or more and 150 or less.

Examples of an alkyl group represented by R include a methyl group, an ethyl group, and an n-propyl group. Among such groups, a methyl group is preferred.

From the viewpoint of strength of the shell layer, n is preferably an integer of 7 or more and 150 or less and more preferably 10 or more and 100 or less.

The specific hollow particles each have a shell layer containing the silsesquioxane represented by formula (1).

The silsesquioxane represented by formula (1) in the shell layer is a hydrolysate of a hydrolyzable trifunctional silane compound.

The hydrolyzable trifunctional silane compound may be a compound represented by the following formula (a):

$$R^aSi(X)_3 \quad (a)$$

wherein $R^a$ is the same as R in formula (1) and represents an alkyl group having 1 or more and 3 or less carbon atoms, a phenyl group, or a vinyl group, and three Xs each independently represent an alkoxy group or a halogen atom.

The alkoxy group represented by X may be an alkoxy group having 1 to 4 carbon atoms, such as a methoxy group, an ethoxy group, a propoxy group, an isopropyloxy group, a butoxy group, and isobutyloxy group.

The halogen atom represented by X may be a fluorine atom, a chlorine atom, a bromine atom, or an iodine atom. Among such atoms, a chlorine atom is preferred.

Among the above groups and atoms, from the viewpoint of hydrolyzability, X preferably represents an alkoxy group and more preferably a methoxy group or an ethoxy group.

The three Xs in formula (a) may be the same with each other or may be different from each other. However, the three Xs are preferably the same with each other.

Examples of the hydrolyzable trifunctional silane in which X represents an alkoxy group include methyltrimethoxysilane, phenyltrimethoxysilane, methyltriethoxysilane, phenyltriethoxysilane, propyltrimethoxysilane, and n-propyltriethoxysilane.

Examples of the hydrolyzable trifunctional silane in which X represents a halogen atom include methyltrichlorosilane, ethyltrichlorosilane, and phenyltrichlorosilane.

Among such compounds, from the viewpoint of reactivity, methyltrimethoxysilane and methyltriethoxysilane are preferred.

The silsesquioxane represented by formula (1) may be any of ladder-type, random-type, and basket-type (i.e, cage-type) silsesquioxanes.

The shell layer containing the silsesquioxane represented by formula (1) may have a monolayer structure including a single layer or a multilayer structure including two or ore layers.

When the shell layer includes two or more layers, at least one layer may contain the silsesquioxane represented by formula (1).

In the present exemplary embodiment, when the shell layer includes two or more layers, the shell layer may include at least one layer containing the silsesquioxane represented by formula (1) (also referred to as a first layer) and a layer containing silica ($SiO_2$) (also referred to as a second layer) outward of the layer containing the silsesquioxane represented by formula (1) (i.e., the first layer).

More specifically, the specific hollow particles may each have a shell layer including two layers. The inner layer may be the first layer containing the silsesquioxane, and the outer layer may be the second layer containing silica ($SiO_2$).

The layer containing silica ($SiO_2$) may be formed by hydrolysis of, for example, tetramethoxysilane or tetraethoxysilane.

From the viewpoint of shape stability of the specific hollow particles, the shell layers of the specific hollow particles preferably have an average thickness within a range of 1 nm to 25 nm, more preferably 1 nm to 20 nm, and still more preferably 1 nm to 10 nm.

From the viewpoint of easy production, dispersibility in the resin molded product, the dielectric properties, and the strength of the film, the specific hollow particles preferably have a number average particle diameter within a range of 100 nm to 10 μm, more preferably 200 nm to 9 μm, and still more preferably 400 nm to 8 μm.

The thickness of the shell layers and the number average particle diameter of the specific hollow particles the resin molded product are measured by the methods described below. Such properties of hollow particles other than the specific hollow particles according to the present exemplary embodiment are measured by the same methods.

First, a cross section is randomly cut out from the resin molded product to prepare a measurement sample. Then, the measurement sample is observed and measured by using a scanning electron microscope (SEM manufactured by Hitachi High-Technologies Corporation) and the image analysis software installed in the SEM. A hundred hollow particles in the cross section of the measurement sample are used for the observation and the measurement.

The thickness of the shell layer is measured at three points of a hollow particle, and the average value is regarded as the thickness of the shell layer of the hollow particle. In such a manner, the thickness of the shell layers of 100 hollow particles is measured. The average value is regarded as the average thickness of the shell layers of the hollow particles.

The number average particle diameter of the specific hollow particles is determined by measuring the particle diameter of 100 hollow particles. The particle diameter of the hollow particle refers to the diameter of a circle having the area the same as the projected area of the observed hollow particle.

When the resin molded product according to the present exemplary embodiment is a sheet-shaped or a film-shaped molded product, the thickness thereof may also be determined by the observation and the measurement performed by using the above SEM and the image analysis software. In other words, the cross section of the resin molded product cut out in the thickness direction is observed, the thickness at three points randomly selected is measured, and the average value is regarded as the thickness of the resin molded product.

Method for Producing Specific Hollow Particles

The method for producing the specific hollow particles may be any method that may form a structure including a shell layer containing the silsesquioxane represented by formula (1) and a void inward of the shell layer. To readily control the particle diameter and the particle size distribution, the method for producing the specific hollow particles may be a template method (specifically, a method that includes producing core-shell particles and removing, thereafter, the core portions).

In a method that includes producing core-shell particles and removing, thereafter, the core portions, the process of removing the core portions differs in accordance with the material of the core portion.

In the present exemplary embodiment, the method for producing the specific hollow particles may be a so-called organic bead template method or organic particle template method, in which a resin particle is used for the core portion. More specifically, a method that includes producing core-shell particles each having a core portion formed of a resin particle and removing, thereafter, the core portions may be used.

Hereinafter, a method that includes producing core-shell particles each having a core portion formed of a resin particle and removing, thereafter, the core portions will be described as the method for producing specific hollow particles.

In the method for producing the specific hollow particles, first, the hydrolysate of the above-described hydrolyzable trifunctional silane compound is generated on the surfaces of the resin particles to form coating layers containing the silsesquioxane represented by formula (1).

Core-shell particles each having a core portion formed of a resin particle and a shell layer that is the coating layer containing the silsesquioxane represented by the following formula (1) are formed, accordingly.

To readily remove the core portions by firing, such resin particles may be (meth)acryl resin particles, polystyrene resin particles, or styrene-(meth)acryl resin particle.

The particle diameter of the resin particles may be selected in accordance with the particle diameter of the specific hollow particles to be produced. For example, the resin particles preferably have a number average particle diameter within the range of 100 nm to 10 µm, more preferably 200 nm to 9 µm, and still more preferably 400 nm to 8 µm.

To generate, on the surfaces of the resin particles, the hydrolysate of a hydrolyzable trifunctional silane compound that may be the trifunctional silane compound represented by the above formula (a), the resin particles are dispersed in an aqueous solvent, and the hydrolyzable trifunctional silane compound may be added thereto. Then, until the hydrolyzable trifunctional silane compound forms coating layers each having the intended thickness, the reaction is continued.

Examples of the aqueous solvent in which resin particles are dispersed include water and a mixture of water and a water-soluble organic solvent. The water-soluble organic solvent used for the aqueous solvent may be a solvent in which resin particles are unlikely to dissolve or do not dissolve. Examples of such a water-soluble organic solvent include alcohols (e.g., methanol, ethanol, and isopropanol).

When the aqueous solvent is a liquid mixture of water and a water-soluble organic solvent, the amount of water in the liquid mixture is preferably 60 mass % or more, more preferably 70 mass % or more and 99 mass % or less, and still more preferably 80 mass % or more and 98 mass % or less.

Examples of the water include distilled water, ion-exchanged water, ultrafiltrated water, and pure water.

In the present exemplary embodiment, when a substance is "water-soluble", 1 mass % or more of the substance dissolves in water at 5° C.

A coating layer containing silica ($SiO_2$) may be formed outward of the coating layer formed of the hydrolysate of the trifunctional silane compound. In such a case, after the coating layer formed of the hydrolysate of the trifunctional silane compound is formed, the hydrolysate of a hydrolyzable tetrafunctional silane compound (e.g., tetramethoxysilane and tetraethoxysilane) may be generated.

As described above, a core-shell particles-dispersed liquid in which core-shell particles each having a coating layer formed of the hydrolysate of the trifunctional silane compound are dispersed in an aqueous solvent is obtained.

Next, the core portions are removed from the obtained core-shell particles.

To remove the resin particles forming the core Portions, heat degradation or chemical degradation may be appropriately selected in accordance with, for example, the type of the resin particles.

When heating is performed to obtain the resin molded product according to the present exemplary embodiment (e.g., when the coating is heated after drying as described later), the core portions may be heat-degraded and removed by such heating.

The amount of specific hollow particles in the resin molded product according to the present exemplary embodiment may be determined in accordance with the dielectric properties and the dimensional stability to heat that are required for the resin molded product. For example, the amount of specific hollow particles is preferably within a range of 10 mass % to 80 massW, more preferably 20 mass % to 80 mass %, and still more preferably 30 mass % to 80 mass %, relative to the total mass of the resin molded product.

The amount of specific hollow particles in the resin molded product may be in a range determined in accordance with the particle diameter of the specific hollow particles. For example, when the specific hollow particles have a number average particle diameter of 100 nm or more and 1,000 nm or less, the amount of specific hollow particles is preferably 10 mass % or more and 60 mass % or less and more preferably 50 mass % or more and 60 mass % or less, relative to the total mass of resin molded product.

When the specific hollow particles have a number average particle diameter of 1 atm or more and 10 atm or less, the amount of specific hollow particles is preferably 50 mass % or more and 80 mass % or less and more preferably 60 mass % or more and 80 mass % or less, relative to the total mass of resin molded product.

Resin

The resin in the resin molded product is a component that functions, in the resin molded product, as a matrix in which hollow particles described later are dispersed.

The resin may be any general resin. The resin may be at least one selected from a group consisting of polyimides and polyamide-imides, since such mpounds have excellent mechanical strength, excellent heat resistance (specifically, a low thermal expansion coefficient), a low dielectric constant, and a low dielectric dissipation factor.

Other than polyimides and polyamide-imides, epoxy resins may be used as the resin.

Polyimide

The polyimide used as the resin may be any resin in which the repeating unit has an imide bond. More specifically, the polyimide may be any imidized polyamic acid, which is a polymer of a tetracarboxylic dianhydride and a diamine compound and also referred to as a polyimide precursor.

Among polyimides, from the viewpoint of excellent heat resistance, the polyimide may be an aromatic polyimide in which an aromatic ring is directly bonded to an imide bond.

The polyamic acid, which is a polyimide precursor, may have a repeating unit represented by the following general formula (I).

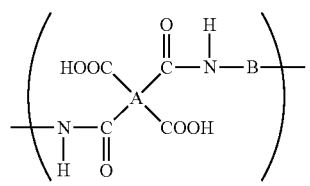

(I)

wherein A represents a tetravalent organic group, and B represents a divalent organic group.

In general formula (I), the tetravalent organic group represented by A is a residue formed by removing four carboxy groups from a tetracarboxylic dianhydride used as a material.

On the other hand, the divalent organic oup represented by B is a residue formed by removing two amino groups from a diamine compound used as a material.

The tetracarboxylic dianhydride may be any aromatic or aliphatic compound and may be an aromatic compound. In other words, in general formula (I), the tetravalent organic group represented by A may be an aromatic organic group.

Examples of the aromatic tetracarboxylic dianhydride include pyromellitic dianhydride, 3,3',4,4'-benzophenone tetracarboxylic dianhydride, 3',4,4'-biphenyisulfone tetracarboxylic dianhydride, 1,4,5,8-naphthalene tetracarboxylic dianhydride, 2,3,6,7-naphthalene tetracarboxylic dianhydride, 3,3',4,4'-biphenyl ether tetracarboxylic dianhydride, 3,3',4,4'-dimethyldiphenylsilane tetracarboxylic dianhydride, 3,3',4,4'-tetraphenylsilane tetracarboxylic dianhydride, 1,2,3,4-furante racarboxylic dianhydride, 4,4'-bis(3,4-dicarboxyphenoxy)diphenyl sulfide dianhydride, 4,4'-bis(3,4-dicarboxyphenoxy)diphenyl sulfone dianhydride, 4,4'-bis(3,4-dicarboxyphenoxy)diphenylpropane dianhydride, 3,3',4,4'-perfluoroisopropylidene diphthalic dianhydride, 3,3',4,4'-biphenyltetracarboxylic dianhydride, 2,3,3',4'-biphenyitetracarboxylic dianhydride, bis(phthalic acid)phenylphosphine oxide dianhydride, p-phenylene-bis(triphenylphthali acid)dianhydride, m-phenylene-bis(triphenylphthalic acid)dianhydride, bis(triphenylphthalic acid)-4,4'-diphenyl ether dianhydride, and bis(triphenylphthalic acid)-4,4'-diphenylmethane dianhydride.

Examples of the aliphatic tetracarboxylic dianhydride include aliphatic or alicyclic tetracarboxylic dianhydrides, such as butanetetracarboxylic dianhydride, 1,2,3,4-cyclobutanetetracarboxylic dianhydride, 1,3-dimethyl-1,2,3,4-cyclobutanetetracarboxylic dianhydride, 1,2,3,4-cyclopentanetetracarboxylic dianhydride, 2,3,5-tricarboxycyclopentylacetic dianhydride, 3,5,6-tricarboxynorbonane-2-acetic dianhydride, 2,3,4,5-tetrahydrofurantetracarboxylic dianhydride, dicarboxylic dianhydride, and bicyclo[2,2,2]-octo-7-ene-2,3,5,6-tetracarboxylic dianhydride; and aliphatic tetracarboxylic dianhydrides having an aromatic ring, such as 1,3,3a,4,5,9b-hexahydro-2,5-dioxo-3-furanyl-naphtho[1,2-c]furan-1,3-dione, 1,3,3a,4,5,9b-hexahydro-5-methyl-(tetrahydro-2,5-dioxo-3-furanyl)-naphtho[1,2-c]furan-1,3-dione, and 1,3,3a,4,5,9b-hexahydro-8-methyl-5-(tetrahydro-2,5-dioxo-3-furanyl)-naphtho[1,2-c]furan-1,3-dione.

Among such compounds, the tetracarboxylic dianhydride is preferably an aromatic tetracarboxylic dianhydride. Specifically, the tetracarboxylic dianhydride is preferably pyromellitic dianhydride, 3,3',4,4'-biphenyltetracarboxylic dianhydride, 2,3,3',4'-biphenyltetracarboxylic dianhydride, 3,3',4,4'-biphenylethertetracarboxylic dianhydride, or 3,3',4,4'-benzophenonetetracarboxylic dianhydride, more preferably pyromellitic dianhydride, 3,3',4,4'-biphenyltetracarboxylic dianhydride, or 3,3',4,4'-benzophenonetetracarboxylic dianhydride, and particularly preferably 3,3',4,4'-biphenyltetracarboxylic dianhydride.

Such tetracarboxylic dianhydrides may be used alone or in a combination of two or more.

When two or more compounds are used in combination, aromatic tetracarboxylic dianhydrides may be used in combination, aliphatic tetracarboxylic dianhydrides may be used in combination, or an aromatic tetracarboxylic dianhydride and an aliphatic tetracarboxylic dianhydride may be used in combination.

The diamine compound has two amino groups in the molecular structure thereof. The diamine compound may be any aromatic or aliphatic compound and may be an aromatic compound. In other words, in general formula (I), the divalent organic group represented by B may be an aromatic organic group.

Examples of the diamine compound include aromatic diamines, such as p-phenyienediamine, m-phenylenediamine, 4,4'-diaminodiphenylmethane, 4,4'-diaminodiphenylethane, 4,4'-diaminodiphenyl ether, 4,4'-diaminodiphenyl sulfide, 4,4'-diaminodiphenyl sulfone, 1,5-diaminonaphthalene, 3,3-dimethyl-4,4'-diaminobiphenyi, 5-amino-1-(4'-aminophenyl)-1,3,3-trimethylindane, 6-amino-1-(4'-aminophenyl)-1,3,3-trimethylindane, 4,4'-diaminobenzanilide, 3,5-diamino-3'-trifluoromethylbenzanilide, 3,5-diamino-4'-trifluoromethylbenzanilide, 3,4'-diaminodiphenyl ether, 2,7-diaminofluorene, 2,2-bis(4-aminophenyl)hexafluoropropane, 4,4'-methylene-bis(2-chloroaniline), 2,2',5,5'-tetrachloro-4,4'-diaminobiphenyl, 2,2'-dichloro-4,4'-diamino-5,5'-dimethoxybiphenyl, 3,3'-dimethoxy-4,4'-diaminobiphenyl, 4,4'-diamino-2,2'-bis(trifluoromethyl)biphenyl, 2,2-bis[4-(4-aminophenoxy)phenyl]propane, 2,2-bis[4-(4-aminophenoxy)phenyl]hexafluoropropane, 1,4-bis(4-aminophenoxy)benzene, 4,4'-bis(4-aminophenoxy)biphenyl, 1,3'-bis(4-aminophenoxy)benzene, 9,9-bis(4-aminophenyl)fluorene, 4,4'-(p-phenyleneisopropylidene)

bisaniline, 4,4'-(m-phenyleneisopropylidene)bisaniline, 2,2'-bis[4-(4-amino-2-trifluoromethylphenoxy)phenyl] hexafluoropropane, and 4,4'-bis[4-(4-amino-2-trifluoromethyl)phenoxy]-octafluorobiphenyl; aromatic diamines that have two amino groups, which are bonded to an aromatic ring of, for example, diaminotetraphenylthiophene, and a heteroatom in addition to nitrogen atoms of the amino groups; and aliphatic diamines and alicyclic diamines, such as 1,1-metaxylilenediamine, 1,3-propanediamine, tetramethylenediamine, pentamethylenediamine, octamethylenediamine, nonamethylenediamine, 4,4-diaminoheptamethylenediamine, 1,4-diaminocyclohexane, isophoronediamine, tetrahydrodicyclopentadienylenediamine, hexahydro-4,7-methanoindanylenedimethylenediamine, tricyclo[6,2,1, $0^{2.7}$]-undecylenedimethyldiamine, and 4,4'-methylenebis (cyclohexylamine).

Among such compounds, the diamine compound is preferably an aromatic diamine compound. Specifically, the aromatic diamine compound is preferably p-phenylenediamine, m-phenylenediamine, 4,4'-diaminodiphenylmethane, 4,4'-diaminodiphenyl ether, 3,4'-diaminodiphenyl ether, 4,4'-diaminodiphenyl sulfide, or 4,4'-diaminodiphenyl sulfone and particularly preferably 4,4'-diaminodiphenyl ether or p-phenyienediamine.

Such diamine compounds may be used alone or in a combination of two or more.

When two or more compounds are used in combination, aromatic diamine compounds may be used in combination, aliphatic diamine compounds may be used in combination, or an aromatic diamine compound and an aliphatic diamine compound may be used in combination.

The polyamic acid preferably has a number average molecular weight of 1,000 or more and 150,000 or less, more preferably 5,000 or more and 130,000 or less, and still more preferably 10,000 or more and 100,000 or less.

The polyimide precursor has a number average molecular weight within the above range, and thus, a decrease in the solubility of the polyimide precursor in a solvent is suppressed, and the polyimide obtained by imidization is likely to improve the moidability of the resin molded product.

The number average molecular weight of the polyimide precursor is measured by gel permeation chromatography (GPC) under the following measurement conditions.

column: TSKgel α-M (7.8 mmI·D×30 cm) manufactured by Tosoh Corporation
    eluent: dimethylformamide (DMF)/30 mM LiBr/60 mM phosphoric acid
    flow rate: 0.6 mL; min,
    injection volume: 60 μL
    detector: refractive index detector. (RI)

Polyamide-imide

The polyamide-imide used as the resin may be any resin in which the repeating unit has an imide bond and an amide bond.

More specifically, the polyamide-imide may be a polymer of a trivalent carboxylic acid having an acid anhydride group (also referred to as a tricarboxylic acid) and a diisocyanate compound or a diamine compound.

The tricarboxylic acid may be a trimellitic anhydride or a derivative thereof. In addition to the tricarboxylic acid, a tetracarboxylic dianhydride, an aliphatic dicarboxylic acid, or an aromatic dicarboxylic acid may be used in combination.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

The diamine compound may be a compound that has the same structure as the above-described isocyanate and that has an amino group in place of an isocyanate group.

Another Component

The resin molded product according to the present exemplary embodiment may contain another component in addition to the resin and the specific hollow particles.

Examples of such a component include components used to produce the resin and components used to produce the specific hollow particles, in addition to the above-described components.

Properties of Resin Molded Product

Dielectric Constant (Relative Dielectric Constant)

The resin molded product according to the present exemplary embodiment preferably has a low dielectric constant (specifically, a relative dielectric constant at 10 GHz) and preferably has a dielectric constant within a range of 1.4 to 2.9 and more preferably 2.0 to 2.8.

Dielectric Dissipation Factor

The resin molded product according to the present exemplary embodiment has a low dielectric dissipation factor and preferably has a dielectric dissipation factor of 0.0060 or more and 0.0100 or less and more preferably 0.0061 or more and 0,0090 or less at 10 GHz, The relative dielectric constant and dielectric dissipation factor of a resin molded product are measured as follows.

The complex dielectric constant of the resin molded product at a frequency of 1 GHz is measured by a cavity resonator perturbation method. The real part ($εr'$) of the complex dielectric constant is regarded as the relative dielectric constant.

The dielectric dissipation factor (tan δ) is the ratio of the imaginary part ($εr''$) to the real part ($εr'$), ($εr''/εr'$).

The measuring apparatus may be a cylindrical cavity resonator apparatus (MICROWAVE NETWORK ANALYZER N5230C manufactured by Agilent Technologies, Inc. and Cavity Resonator 1 GHz manufactured by Kanto Electronics Application. Development Inc.). A strip-shape test piece (2 mm width×70 mm length) is used for the measurement.

Thermal Expansion CoebCoefficient

The resin molded product according to the present exemplary embodiment has a high dimensional stability to heat and preferably has a thermal expansion coefficient within a range of 1 ppm/K to 20 ppm/K, more preferably 2 ppm/K to 18 ppm/K, and still more preferably 5 ppm/K to 15 ppm/K.

The thermal expansion coefficient is calculated from the TMA curve (displacement), which is determined by thermomechanical analysis (TMA) in conformity with JIS K 7197-1991 with the temperature of a test piece (width 10 mm, thickness 50 μm, length. 20 mm) changed from room temperature to 180° C. under a non-oscillatory compression load (constant load).

Porosity

The resin molded product according to the present exemplary embodiment preferably has a porosity within a range of 20% to 80%, more preferably 30% to 80%, and still more preferably 40% to 78%.

The resin molded product has a porosity within the above range and thus, is likely to have excellent dielectric properties and high dimensional stability to heat.

Here, the porosity of the resin molded product is the percentage (%) of the volume of voids relative to the apparent volume of the resin molded product including voids and is determined by the following formula (II):

$$\text{Porosity (\%)} = (V_1 - V_0)/V_1 \times 100 \tag{II}$$

wherein $V_1$ represents the apparent volume of the resin molded product including voids, and $V_0$ represents the actual volume calculated from the mass and the density of solids (i.e., the resin, the shell layers of the specific hollow particles, and optional components added in accordance with the necessity).

Applications and Shapes of Resin Molded Product

Examples of the applications of the resin molded product according to the present exemplary embodiment include insulating films for circuit boards (e.g., interlayer insulating films) and protecting films for high-frequency and/or high-voltage wires.

Among such applications, due to excellent dielectric properties and high dimensional stability to heat, the resin molded product may be used as insulating films for circuit boards.

The resin molded product according to the present exemplary embodiment may have any shape according to applications thereof.

For example, when used as an insulating film for a circuit board, the resin molded product may be a film or a sheet. When the resin molded product according to the present exemplary embodiment is a film or a sheet, from the viewpoint of production and excellent dielectric properties, such a film or a sheet preferably has a thickness of 1 μm or more and 200 μm or less, more preferably 10 μm or more and 100 μm or less, and still more preferably 20 μm or more and 90 μm or less.

The thickness is measured by the observation and the measurement with SEM, as described above.

Method for Producing Resin Molded Product

The method for producing the resin molded product according to the present exemplary embodiment may be a method that includes applying, to an object to be coated, a coating liquid that is the resin composition according to the present exemplary embodiment and drying the resultant coating film. The method will be described later. If necessary, the coating film may be heated after drying.

The method for producing the resin molded product according to the present exemplary embodiment is not limited to the above method and may be appropriately selected in accordance with the application and the shape of the resin molded product and the type of the resin.

The method for producing a resin molded product by using the resin composition according to the present exemplary embodiment will be fully described later.

Applications of Resin Molded Product

Specific examples of the applications of the resin molded product include semiconductor substrates on which an integrated circuit is formed, circuit boards on which wiring is formed, and insulating films for printed circuit boards on which an electronic component and wiring are disposed (interlayer insulating films).

Protecting films for high-frequency and/or high-voltage wires are further included.

Resin Composition

The resin molded product according to the present exemplary embodiment may be produced by using the following resin composition (i.e., the resin composition according to the present exemplary embodlment).

The resin composition according to the present exemplary embodiment contains a resin or a precursor thereof and core-shell particles each having a shell layer containing the silsesquioxane represented by the above formula (1).

Hereinafter, the resin composition according to the present exemplary embodiment is also simply referred to as "resin composition". Core-shell particles each having a shell layer containing the silsesquioxane represented by formula (1) are also referred to as "specific core-shell particles".

Specific Core-Shell Particles

In the resin composition according to the present exemplary embodiment, the specific core-shell particles may be any kind of particles each having a shell layer containing the silsesquioxane represented by formula (1).

The core portion may be formed of an inorganic material or an organic material, or may be a void.

In other words, the specific core-shell particles may be hollow particles each having a void inside, that is, particles the same as the above-described specific hollow particles.

The shell layers of the specific core-shell particles may be the same as the shell layers of the above-described specific hollow particles and may have the same preferable features as the shell layers of the above-described specific hollow particles.

When the specific core-shell particle includes a shell layer including two or more layers, at least one layer may contain the silsesquioxane represented by for formula (1). When the shell layer includes two or more layers, at least one layer contains the silsesquioxane represented by formula (1), which is also referred to as a first layer, and the shell layer may include, outward of the first layer, a layer containing silica ($SiO_2$) that is also referred to as a second layer.

More specifically, the specificcore-shell particle may have a shell layer including two layers. The inner layer may be a first layer containing the silsesquioxane, and the outer layer may be a second layer containing silica ($SiO_2$).

The layer containing silica ($SiO_2$) may be formed by hydrolysis of, for example, tetramethoxysilane or tetraethoxysilane.

The shell layers of the specific core-shell particles have the same average thickness as the shell layers of the above-described specific hollow particles. The average thickness of the shell layers of the specific core-shell particles is in the same preferable ranges as that of the shell layers of such specific hollow particles.

The thickness of the shell layers of the specific core shell particles in the resin composition according to the present exemplary embodiment is measured by using specific core-shell particles that have been taken out from the resin composition to be embedded in a resin. When specific core-shell particles embedded in a resin are not used, the thickness of the shell layers of the specific core-shell particles is measured in the same manner as the thickness of the shell layers of hollow particles, as described above.

The core portions of the specific core-shell particles may be formed of an organic material to be readily removed during the production of the resin molded product. Among organic materials, the core portions may be formed of a resin particle described in the section of the method for producing specific hollow particles.

The specific core-shell particles have the same number average particle diameter as the above-described specific hollow particles. The number average particle diameter of the specific core-shell particles is the same preferable ranges as that of such specific hollow particles.

The number average particle diameter of the specific core-shell particles is measured as follows. The particle sire distribution is obtained by the measurement with a laser diffraction particle size distribution analyzer (e.g., the above-described COULTER COUNTER LS13, manufactured by Beckman Coulter, Inc.). The particle size distribution is divided into particle size sections (channels). Cumulative number distribution of the particles is drawn from smaller particle sizes. The particle size at which the cumulative number is 50% relative to the number of all particles is defined as a number average particle diameter.

The amount of specific core-shell particles in the resin composition according to the present exemplary embodiment may be 10 mass % or more and 80 mass % or less relative to the total solid content the resin composition.

Here, the solids refer to all components other than the solvent.

Resin or Precursor Thereof

The resin composition according to the present exemplary embodiment contains a resin or a precursor thereof, The resin may be the same as the resin described in the section of the resin molded product according to the present exemplary embodiment.

The precursor of the resin may be a polyamic acid, which is a precursor of a polyimide.

The resin or a precursor thereof of the resin composition according to the present exemplary embodiment is preferably one selected from a group consisting of polyamic acids and polyamide-imides and is more preferably a polyamic acid.

Polyamic acids may be the polyamic acids described in the section of the resin molded product according to the present exemplary embodiment and may have the same preferable features as such polyamic acids.

Polyamide-imides may be the polyimide-imides described in the section of the resin molded product according to the present exemplary embodiment and may have the same preferable features as such polyamide-imides.

The amount of the resin or a precursor thereof in the resin composition according to the present exemplary embodiment may be 20 mass % or more and 90 mass % or less relative to the total solid content in the resin composition, Another Component The resin composition according to the present exemplary embodiment may further contain another component.

Examples of such a component include solvents, organic amine compounds that increase the solubility of the polyamic acid, catalysts that promote the imidization reaction of the polyamic acid, and leveling agents that improve the film properties Examples further include, in addition to the above-described compounds, components used to obtain the resin or a precursor of the resin and components used to obtain the specific core-shell particles.

Solvent

The solvent in the resin composition according to the present exemplary embodiment may be a solvent in which the resin or a precursor thereof dissolves and in which the core-shell particles are unlikely to dissolve or do not dissolve.

Specific examples of the solvent include water and mixtures of water and water-soluble organic solvents The amount of water in the total solvent is preferably 50 mass % or more and 100 mass % or less, more preferably 70 mass % or more and 100 mass % or less, and still more preferably 80 mass % or more and 100 mass % or less Examples of the water include distilled water, ion-exchanged water, ultrafiltrated water, and pure water.

Examples of the water-soluble organic solvent include water-soluble ether-based solvents each having an ether bond in a molecule, water-soluble ketone-based solvents each having a ketone group in a molecule, water-soluble alcohol-based solvents each having an alcohol-based hydroxy group in a molecule, and water-soluble polar aprotic solvents, such as N-methyl-2-pyrrolidone (NMP).

The amount of solvent in the resin composition is any amount and may be appropriately determined in accordance with, for example, the type or the molecular weight of the resin or a precursor thereof, or in accordance with, for example, the conditions of the production of the resin molded product.

Organic Amine Compound.

An organic amine compound that increases the solubility of the polyamic acid may be an organic amine compound other than diamine compounds used during the production of the polyamic acid.

The organic amine compound forms an amine salt with a carboxy group of the polyamic acid to increase the solubility of the polyamic acid in the solvent and also functions as an imidization promoter.

Specifically, the organic amine compound may have a molecular weight of 170 or less.

Examples of the organic amine compound include primary amine compounds, secondary amine compounds, and tertiary amine compounds. Among such compounds, secondary amine compounds and tertiary amine compounds are preferred, and tertiary amine compounds are particularly preferred.

Specific preferable examples of the organic amine compound include 2-dimethylaminoethanol, 2-diethylaminoethanol, 2-dimethylaminopropanol, pyridine, triethylamine, picoline, N-methylmorpholine, N-ethylmopholine, 1,2-dimethylimidazole, 2-ethyl-4-methylimdazole, N-methylpiperidine, and N-ethylpiperidine. Catalyst Examples of a catalyst that promotes the imidization reaction of the polyamic acid include dehydrating agents, such as acid anhydrides, and acid catalysts, such as phenol derivatives, sulfonic acid derivatives, and benzoic acid derivatives.

Method for Producing Resin Molded Product by Using Resin Composition according to Present Exemplary Embodiment Hereinafter, the method for producing a resin molded product by using the resin composition according to the present exemplary embodiment will be described.

Here, an example in which a polyamic acid is used as the precursor of the resin will be described; however, the present exemplary embodiment is not limited thereto.

The method for producing a resin molded product by using a polyamic acid includes preparing the resin composition (hereinafter, also referred to as preparation of the resin composition), applying the resin composition to an object to be coated and drying the obtained coating film (hereinafter, also referred to as formation of a coating film), and heating the coating film after drying (hereinafter, also referred to as heating).

Preparation of Resin Composition

First, a resin composition containing the polyamic acid and the specific core-shell particles (the resin composition according to the present exemplary embodiment) is obtained.

Specifically, the resin composition containing a solvent in which a polyamic acid dissolves and in which the specific core-shell particles are dispersed is obtained.

For preparation of the resin composition, a polyamic acid solution obtained, by synthesizing a polyamic acid in the solvent may be used.

For preparation of the resin composition, a core-shell particles-dispersed liquid obtained by generating the specific core-shell particles in the solvent may be used.

In other words, the method for preparing the resin composition may be a method in which the specific core-shell particles are dispersed in a polyamic acid solution, a method in which a polyamic acid is dissolved in, a specific core-shell particles-dispersed liquid, or a method in which a polyamic acid solution and a specific core-shell particles-dispersed liquid are mixed together.

The resin composition may be prepared by synthesizing a polyamic acid in a solvent in which the specific core-shell particles are dispersed (e.g., specific core-shell particles-dispersed liquid).

The above-described polyamic acid solution is obtained by mixing a tetracarboxylic dianhydride and a diamine compound in a solvent to polymerize the tetracarboxylic dianhydride and the diamine compound. To increase the solubility of the polyamic acid in the solvent, the above-described organic amine compound may be used in addition to the tetracarboxylic dianhydride and the diamine compound.

The above-described specific core-shell particles-dispersed liquid may be obtained by generating the hydrolysate of a hydrolyzable trifunctional silane compound on the surfaces of the resin particles in the solvent to form coating layers containing the silsesquioxane represented by formula (1).

The method for obtaining the specific core-shell particles-dispersed liquid is the same as the method for obtaining the core-shell particles-dispersed liquid, described in the section of the method for producing the specific hollow particles, and has the same preferable features as such a method.

Outward of the coating layer containing the silsesquioxane represented by formula (I), a coating layer containing silica ($SiO_2$) may be formed. In such a case, after the coating layer containing the silsesquioxane represented by formula (1) is formed, the hydrolysate of a hydrolyzable tetrafunctional silane compound (e.g., tetramethoxysilane and tetraethoxysilane) may be generated.

Formation of Coating Film

For the formation of a coating film, a resin composition is applied to an object to be coated, and the obtained coating film is dried.

The object to be coated may formed of any material. Examples of the material include resins, glass, ceramics, metal, and composite materials in which such materials are used in combination. The object to be coated may be a member that has removability and that is to be removed from the formed resin molded product or a member that forms, with the formed resin molded product, a manufactured article or a member used as a part (e.g., substrate).

Examples of the substrate include semiconductor substrates on which an integrated circuit is formed, wiring substrates on which wiring is formed, and printed substrates on which an electronic component and wiring are disposed.

The object to be coated may be a wire for a coated wire,

The method for applying the resin composition to the object to be coated may be any method. Examples of the method include spray coating, rotation coating, roll coating, bar coating, slit dye coating, and inkjet coating.

The amount of the resin composition applied may be determined such that the coating film after drying has a predetermined thickness.

Subsequently, the formed coating film is dried. This forms a dried coating film to be imidized.

The coating film may be dried by heat drying, air drying, natural drying, or vacuum drying.

Heat drying may be performed at 80° C. or higher and 200° C. or lower for 10 minutes or more and 60 minutes or less. The higher the temperature, the shorter the heating time.

For heating, applying hot air to the coating film is also effective.

For drying, the temperature may be raised stepwise or gradually to an intended temperature at a certain rate.

Heating

Subsequently, the coating film obtained by the formation of a coating film is heated.

In other words, in heating, the dried coating film to be imidized is heated to perform imidization treatment. When the specific core-shell particles each having a resin particle used as a core portion are used in the resin composition, the resin particles may be removed by heat degradation during the heating.

In the imidization treatment, heating at 150° C. or higher and 450° C. or lower (preferably 200° C. or higher and 430° C. or lower) for 20 minutes or more and 60 minutes or less may cause an imidization reaction, thereby obtaining a polyimide.

For heating, the temperature may be stepwise raised or gradually raised at a certain rate, to an intended temperature.

According to the above processes, the resin molded product containing the polyimide resin and the specific hollow particles is obtained.

If necessary, the formed resin molded product may be removed from the coated object.

The formed resin molded product may be further subjected to post-processing in accordance with intended applications.

EXAMPLES

Hereinafter, Examples will be described. The exemplary embodiment of the disclosure is not limited to the following Examples. In the following description, the unit "part" and "%" are based on mass, unless stated otherwise.

Preparation Resin Composition (1)

To 104 parts by mass of the aqueous dispersion (solid content 2 of polystyrene resin particles having a number average particle diameter of 400 nm, 70 parts by mass of water and 0.11 mass of 3-(2-aminoethylamino)-proplyl) trimethyoxysilane are added, and thereafter 11.6 parts by mass of 10% ammonia aqueous solution is added to adjust pH to 9.6. The liquid mixture is heated to 75° C., and 5.41 parts by mass of methyltrimethoxysilane is added thereto during stirring, and the reaction is performed over 200 minutes to form the shell layer, thereby preparing a slurry containing the core-shell particles.

To 153 parts by mass of the slurry, 43 parts by mass of water, 5.24 parts by mass of paraphenylenediamine, and 14.25 parts by mass of 3,3',4,4'-biphenyltetracarboxylic dianhydride are added and heated to 50° C. Thereafter, 33.5 parts by mass of 44% methylmorpholine aqueous solution is dropped over 90 minutes. Then, stirring is performed at 50° C. for 12 hours to polymerize the polyamic acid, thereby obtaining the resin composition (1).

Preparation of Resin Composition (2)

The resin composition (2) is prepared in the same manner as the resin composition (1), except that during the formation of the shell layer, 1.1 parts by mass of tetramethoxysilane is dropped after methyltrimethoxysilane is added.

Preparation of Resin Composition (3)

The resin composition (3) is prepared in the same manner as the resin composition (1), except that during the formation of the shell layer, 10.84 parts by mass of methyltrimethoxysilane is added.

Preparation of Resin Composition (4)

The resin composition (4) is prepared in the same manner as the resin composition (1), except that 120 parts by mass of water is added to 76 parts by mass of the slurry when the polyamic acid is polymerized to obtain the resin composition.

Preparation of Resin Composition (5)

The resin composition (5) is prepared in the same manner as the resin composition (1), except that polystyrene resin particles having a number average particle diameter of 5 μm are used.

Preparation of Resin Composition (6)

The resin composition (6) is prepared in the same manner as the resin composition (1), except that 60 parts by mass of methyltrimethoxysilane is added during the formation of the shell layer.

Preparation of Resin Composition (7)

The resin composition (7) is prepared in the same manner as the resin composition (1), except that 165 parts by mass of water is added to 15 parts by mass of the slurry when the polyamic acid is polymerized to obtain the resin composition.

Preparation of Resin Composition (8)

The resin composition (8) is prepared in the same manner as the resin composition. (1), except that polystyrene resin particles having a number average particle diameter of 12 μm are used.

Preparation of Resin Composition (A)

The resin composition (A) is prepared in the same manner as the resin composition (1), except that 5.41 parts by mass of tetramethoxysilane is dropped during the formation of the shell layer.

Example 1

The resin composition (1) is applied to a glass substrate (manufactured by Matsunami Glass Ind., Ltd.) with an applicator. The applied coating film is dried at 100° C. for 60 minutes, and thereafter, the temperature is raised at 2° C./minute to 400° C. and maintained at 400° C. for 60 minutes.

After the temperature is lowered to room temperature, the resin molded product having a film thickness of 50 μm is obtained.

Examples 2 to 8 and Comparative Examples 1 to 2

A resin molded product having a film thickness of 50 μm is obtained in the same manner as in Example 1, except that the resin composition (1) is changed to any of the resin compositions (2) to (8), (A), and (B) indicated in Table 1.

Measurement of Relative Dielectric Constant and Dielectric Dissipation Factor

The relative dielectric constant and the dielectric dissipation factor of the obtained resin molded products at 10 GHz are measured by the above-described method.

Measurement of Thermal Expansion Coefficient

The thermal expansion coefficient of the obtained resin molded products is measured by the above-described method.

The obtained thermal expansion coefficient is used as the evaluation index of dimensional stability to heat.

Evaluation of Tensile Strength at Break

Each obtained resin molded product is cut into a strip having a length of 10 cm and a width of 5 mm, and the tensile strength at break of the strip is measured with a tensile tester (STROGRAPH manufactured by Toyo Seiki Seisaku-sho, Ltd.).

TABLE 1

| | | | Hollow particles | | | | | Measurement and Evaluation | | | |
| | | | Shell layer | | Number | | | | | | |
| | Resin composition No. | Insulating resin | Layer structure | Presence of silsesquioxane | Average thickness [nm] | average particle diameter [nm] | Amount [mass %] | Porosity [%] | Relative Permittivity | Dielectric dissipation factor | Thermal expansion coefficient [ppm/K] | Tensile strength at break [MPa] |
|---|---|---|---|---|---|---|---|---|---|---|---|---|
| Example 1 | (1) | PI | single layer | present | 3 | 400 | 60 | 57 | 2.3 | 0.0064 | 13 | 60 |
| Example 2 | (2) | PI | two layers | present | 3 | 400 | 60 | 57 | 2.4 | 0.0069 | 10 | 76 |
| Example 3 | (3) | PI | single layer | present | 6 | 400 | 60 | 55 | 2.6 | 0.0070 | 11 | 63 |
| Example 4 | (4) | PI | single layer | present | 3 | 400 | 30 | 29 | 2.8 | 0.0072 | 12 | 122 |
| Example 5 | (5) | PI | single layer | present | 3 | 5000 | 60 | 60 | 2.2 | 0.0068 | 12 | 131 |
| Example 6 | (6) | PI | single layer | absent | 30 | 400 | 60 | 37 | 2.8 | 0.0073 | 11 | 71 |
| Example 7 | (7) | PI | single layer | absent | 3 | 400 | 8 | 8 | 2.8 | 0.0074 | 11 | 180 |
| Example 8 | (8) | PI | single layer | absent | 3 | 12000 | 60 | 60 | 2.5 | 0.0071 | 10 | 142 |
| Comparative Example 1 | (A) | PI | single layer | absent | 3 | 400 | 60 | 57 | 3.8 | 0.0120 | 11 | 81 |
| Comparative Example 2 | (B) | PI | single layer | absent | 13 | 100 | 60 | 24 | 2.6 | 0.0056 | 25 | 54 |

Preparation of Resin Composition (B)

The resin composition (B) is prepared in the same manner as the resin composition (1), except that the slurry prepared by dispersing, in water, hollow particles each having a shell layer formed of an organic material (TECHPOLYMER NH manufacture by SEKISUI PLASTICS CO., Ltd.) is used when the polyamic acid is polymerized to obtain the resin composition.

The above results show that the resin molded products in Examples each have a low relative dielectric constant, a low dielectric dissipation factor, a low thermal expansion coefficient, and excellent dimensional stability to heat.

The foregoing description of the exemplary embodiment of the present disclosure has been provided for the purposes of illustration and description. It is not intended to be exhaustive or to limit the disclosure to the precise forms disclosed. Obviously, many modifications and variations will be apparent to practitioners skilled in the art. The embodiment was chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A resin molded product comprising:
   a resin; and
   hollow particles each having a shell layer containing a silsesquioxane represented by the following formula (1):

$$(RSiO_{1.5})_n \qquad (1)$$

wherein R represents an alkyl group having 1 or more and 3 or less carbon atoms, a phenyl group, or a vinyl group, and n is an integer of 7 or more and 150 or less.

2. The resin molded product according to claim 1, wherein each of the hollow particles has a shell layer including two or more layers.

3. The resin molded product according to claim 2, wherein the shell layer including two or more layers includes at least one first layer containing the silsesquioxane represented by formula (1) and a second layer containing silica ($SiO_2$) outward of the first layer.

4. The resin molded product according to claim 1, wherein the shell layer has an average thickness within a range of 1 nm to 25 nm.

5. The resin molded product according to claim 1, wherein the resin is selected from the group consisting of polyimides and polyamide-imides.

6. The resin molded product according to claim 5, wherein the polyamides are aromatic polyimides.

7. The resin molded product according to claim 1, wherein an amount of the hollow particles is within a range of 10 mass % to 80 mass % relative to a total mass of the resin molded product.

8. The resin molded product according to claim 1, wherein the hollow particles have a number average particle diameter within a range of 100 nm to 10 μm.

9. The resin molded product according to claim 1, wherein the resin molded product has a dielectric constant within a range of 1.4 to 2,9.

10. The resin molded product according to claim 1, wherein the shell layer has a thermal expansion coefficient within a range of 1 ppm/K to 20 ppm/K.

11. The resin molded product according to claim 1, wherein the resin molded product has a porosity within a range of 20% to 80%.

* * * * *